US007293511B2

(12) United States Patent
Prigmore et al.

(10) Patent No.: US 7,293,511 B2
(45) Date of Patent: Nov. 13, 2007

(54) GASIFICATION APPARATUS AND METHOD

(75) Inventors: Robert Marshall Prigmore, Carmarthen (GB); Brian Davies, Carmarthen (GB); Colin Cook, Carmarthen (GB)

(73) Assignee: Hudol Limited, Carmarthen, Wales (GB)

( * ) Notice: Subject to any disclaimer, the term of this patent is extended or adjusted under 35 U.S.C. 154(b) by 299 days.

(21) Appl. No.: 10/546,809

(22) PCT Filed: Mar. 2, 2004

(86) PCT No.: PCT/GB2004/000872

§ 371 (c)(1), (2), (4) Date: Aug. 25, 2005

(87) PCT Pub. No.: WO2004/078879

PCT Pub. Date: Sep. 16, 2004

(65) Prior Publication Data
US 2006/0144304 A1    Jul. 6, 2006

(30) Foreign Application Priority Data
Mar. 7, 2003    (GB) ................... 0305224.8

(51) Int. Cl.
*F23B 7/00* (2006.01)
(52) U.S. Cl. .................. 110/341; 110/229; 110/186; 110/255; 110/258; 48/197 R
(58) Field of Classification Search .............. 48/197 R; 110/346, 255, 258, 227, 267, 292, 293, 295, 110/101 R, 101 C, 101 CF, 101 CA, 118
See application file for complete search history.

(56) References Cited

U.S. PATENT DOCUMENTS

| 3,118,574 A | | 1/1964 | Compte |
| 3,150,063 A | | 9/1964 | Compte |
| 3,586,084 A | | 6/1971 | Redmond |
| 3,841,836 A | | 10/1974 | Lunsford, Jr. et al. |
| 4,374,288 A | * | 2/1983 | Scragg ................. 568/910 |
| 4,539,917 A | | 9/1985 | Mallon et al. |
| 4,732,092 A | | 3/1988 | Gould |
| 5,156,545 A | | 10/1992 | Deblock et al. |
| 5,198,018 A | | 3/1993 | Agarwal |
| 6,101,958 A | * | 8/2000 | Beckmann et al. ......... 110/346 |

FOREIGN PATENT DOCUMENTS

| DE | 490556 | 1/1930 |
| DE | 4037743 | 6/1991 |
| GB | 741353 | 11/1955 |
| GB | 2319025 | 5/1998 |
| JP | 100103860 | 4/1998 |
| WO | WO 2003/018220 | 3/2003 |

* cited by examiner

*Primary Examiner*—Kenneth Rinehart
(74) *Attorney, Agent, or Firm*—Dennison, Schultz & MacDonald

(57) ABSTRACT

An apparatus and method for the treatment of particulate organic waste material, the apparatus comprising: a hopper means having flow control means for controlling flow rate of the waste material; a pyrolysis unit having (i) a heating means for heating the material, and (ii) a means in the form of a cascade of vanes for controlling rate of flow therethrough; means for removing gaseous products generated in the pyrolysis unit, the gaseous products being recycled; and residual treated waste material collection means.

12 Claims, 4 Drawing Sheets

GASIFICATION APPARATUS AND METHOD

This application is a 371 of PCT/GB2004/000872 filed on Mar. 2, 2004.

The present invention relates to gasification apparatus for the treatment of organic waste material or of material contaminated with at least organic materials.

Gasification systems are intended to destroy —CH— compounds, basically organic materials. Such materials may constitute a waste stream in themselves such as from municipal "black bag" waste or from materials which have contaminated work sites for example. Gasification systems heat organic waste or soil, for example, contaminated with oil, for example, at a temperature generally in the range from about 700 to about 800° C. in a substantially oxygen-free environment to break down long chain molecules into smaller molecules which, ideally can be contained and recycled or used as a fuel, for example.

Organic compounds will if heated in the absence of oxygen, break down into lower molecular weight compounds. Solids can break down, changing their physical form to liquids or gases, for example. The rate of break down is dependent upon temperature and hence availability of energy. Therefore, the resulting product obtained is dependent upon the temperature of treatment and on the time at which the contaminated material has been at temperature.

However, many existing gasification systems are poorly controlled and the process goes too far in that the contaminants are completely degraded within the gasification apparatus to yield carbon (and hydrogen) which is of little use to any industry and must be disposed of safely. Moreover, the generation of carbon can cause the apparatus to become choked by coating the internal surfaces thereof thus impeding the flow of waste material through the apparatus and also reducing the heat transfer efficiency to the waste material flowing through the apparatus.

Known gasification systems generally utilise mechanically driven fans or paddles to move and distribute heat in the system and have the following further disadvantages: poor control over process parameters, leading to little control of the final products produced; mechanical moving parts in high temperature environments leading to regular maintenance requirements and frequent process down time.

The apparatus may also have means for heating the waste material substantially in the absence of oxygen or air.

According to a first aspect of the present invention there is provided apparatus for the treatment of potentially particulate organic waste material, the Apparatus for the treatment of potentially particulate organic waste material, the apparatus including: hopper means having flow control means for controlling the rate of flow of material from said hopper means; at least one pyrolysis unit having heating means for heating said material, said at least one pyrolysis unit having therein means for controlling a rate of flow of material therethrough; means for removing gaseous products generated in said at least one pyrolysis unit, said gaseous products being recycled or collected; and, treated waste material collection means, the apparatus being characterised in that the means for controlling the rate of flow of material comprises a plurality of vanes.

According to a second aspect of the present invention there is provided A method of treating potentially particulate organic waste material, the method comprising the steps of: providing hopper means having means to control a rate of flow of material therefrom; providing at least one pyrolysis unit having heating means for heating said waste material; providing said at least one pyrolysis unit with means to control the rate of flow of said waste material therethrough; passing said waste material through said at least one pyrolysis unit; providing means for removing gaseous products generated during heat treatment of said waste material for collecting and/or recycling; and, providing treated waste material collection means, characterised in that the means to control the rate of flow through said at least one pyrolysis unit comprises a plurality of vanes.

In a preferred embodiment of the method of the present invention, the waste material may be heated substantially in the absence of oxygen or air.

In this specification the term "potentially particulate waste material" is intended to cover any material which can be physically broken down into "particles" which can be fed through the apparatus. Thus, such material may include, for example, contaminated materials such as; clods of soil; building materials such as concrete, cement, stone, aggregate and brickwork, for example, which can be pre-crushed into sufficiently small pieces; and sand, for example. Alternatively, the organic waste material may comprise a waste stream in itself and include materials such as; municipal "black bag" waste, tyres, waste paper, cardboard and packaging materials, natural wastes such as forestry wood off cuts, pine needles and the like. Clearly this list is not exhaustive and only lists a few of the potential sources of material which can be treated by the apparatus and method according to the present invention.

Any waste to be pyrolised would need to be treated to ensure that the particles of waste are of a correct size and the moisture content is of an acceptable level. This may be achieved by a combination of some or all of the following known processes: high temperature steam treatment, segregation, drying and shredding. Municipal waste, for example, would require treatment with high temperature steam in an autoclave and then segregation of the ferrous and non-ferrous metallic content by use of magnets and eddy current separation for example, followed by drying. Wood off cuts may be treated, for example, by shredding and drying.

The organic material may comprise gaseous materials adsorbed or occluded on the surface of particles of waste; liquid organic material soaked into the waste material or solid organic materials such as scrap synthetic plastics materials on their own or mixed up with other waste materials.

In one embodiment of apparatus according to the present invention, gravity is used to promote and assist the flow of material through the apparatus, the component units thereof being arranged in a generally vertical manner. However, additional assistance in the form of vibrators or shakers may also be utilised with the apparatus and method of the present invention to assist flow of material.

As mentioned above, the process to break down large molecules into smaller molecules is preferably carried out in the absence of oxygen or air. Thus, the apparatus according to the present invention, when being used to implement the method of the present invention, as far as possible excludes the ingress of air into the system. In this specification the waste materials are preferably heated substantially in the absence of oxygen. Whilst it is an impossibility for the apparatus or process to be completely free of oxygen or completely sealed against the ingress thereof in absolute terms, the description of "substantially oxygen-free" is to be taken to mean that reasonable steps have been taken in terms of process engineering to prevent the free access of air to the heating chambers in which the waste material is being heated.

The hopper means may be a container or tank having an upper face open to receive waste which is either periodically or continuously topped-up to maintain a relatively large volume of waste to be treated therein and form a seal with the container and so exclude large scale ingress of air. The hopper means may have a lower frusto-conical portion, for example, so as to channel the waste towards the flow control means which may be a mechanically driven compartmentalised rotary valve known in the art and which also serves to exclude large quantities of air from entering the apparatus. Control of the flow control valve may be integrated with an overall process control system to control the rate of admission of waste material in response to temperature sensors in the pyrolysis unit for example.

The at least one pyrolysis unit may comprise a box-like structure having an inner chamber or passage through which waste to be treated may pass and, an outer chamber generally surrounding at least the vertical walls of the inner chamber or passage, the outer chamber being supplied with heating means such as combustion gases to heat the interior of the inner chamber. The inner chamber is closed to the ambient environment so that neither air nor combustion gases may enter. Only waste material from the flow control valve may enter the inner chamber.

The heating means for the outer chamber may be gas burners and the temperature controlled by temperature sensing means such as thermocouples, for example, by a feedback control loop. Heat is then transferred to the inner chamber or passage by conduction and convection, the temperature thereof being controlled by the temperature of the outer chamber.

The inner chamber or passage of the at least one pyrolysis unit may also be provided with a plurality of movable plates or vanes onto which the waste material falls during its passage through the apparatus. The plates or vanes may be positioned alternately on opposing inner faces of the inner chamber so as to form a cascade-like structure within the inner chamber. In its passage through the pyrolysis unit, the waste material falls onto the first vane, slides over the surface and then onto the next lower vane in the series and so on until the waste material passes out of the heating part of the apparatus and into the final collection means.

The vanes may be attitude controllable, that is to say that the angle of inclination of each vane may be altered with respect to a reference datum so as to control the rate of flow of the waste material through the pyrolysis unit. For example, if the waste material is flowing too quickly through the pyrolysis unit and is consequently not reaching the desired temperature, then the angles of the vanes to a horizontal datum, for example, may be reduced so as to reduce the flow rate of waste material through the pyrolysis units. Similarly, if the temperature of the waste material is too high then the relative angles of the vanes may be increased so as to increase the flow rate.

The vanes may be mounted on pivot means such as shafts or axles passing through the pyrolysis unit, the axles having suitable attitude control means such as lever arms, bellcranks or the like at their ends, preferably outside the pyrolysis unit, that is, not in the heated part thereof. The attitude control means may be connected into the control system for the apparatus such that the attitude of the vanes is automatically controlled by position control means such as electro-mechanical servos, hydraulic cylinders, pneumatic cylinders or any suitable position control means known in the art, in response to temperature control signals from the temperature sensors in a feed back loop control system.

The vanes may not all be controlled in the same way, that is to say that some vanes may be set to different attitudes than other vanes in the same pyrolysis unit or to vanes in another pyrolysis unit either upstream or downstream thereof. Thus, it may be desirable for particular processing reasons to vary the rate of flow of waste material within the apparatus.

The waste cascades from one vane to the next breaking up agglomerated particle groups into smaller groups and allows the hot gases in the inner chamber or passage to flow through the falling material accelerating pyrolysis thereof and causing natural turbulence. Such turbulence assists the transfer of heat from the chamber walls to the waste material and helps to provide uniformity of temperature within the apparatus.

In a preferred embodiment of the apparatus according to the present invention there is also provided additional means for supplying a particulate treatment assist material such as sand into the apparatus, for example. The additional means may comprise a dedicated hopper or may alternatively comprise feeding means which supplies treatment assist material to the waste material hopper. Additional hopper means may be provided with heating means so as to heat the treatment assist material in the additional hopper means. This treatment assist material is to aid precise control of the rate of energy input into the apparatus. Thus the treatment assist material provides a secondary energy input for peak flows of waste material. A further important advantage of using a heated treatment assist material is that it forms a hot flowing bed, of material which passes over the cascade vanes with the waste material being treated and thus, where the waste material contains plastics materials prone to melting, prevents that material from sticking to the vane surfaces. This is important because when the plastics material becomes stuck to the apparatus it invariably overheats and degrades eventually to carbon and partly negates the objectives of the apparatus and process which are to precisely control the pyrolysis process. The treatment assist material can be recycled by passing the treated waste material and sand, for example, through screens, for example, to separate the differing particle sizes. Other separation means are known in the art and can be used.

The ability to recycle the treatment assist material saves both material and heat energy.

The apparatus is also provided at various points with gas collection conduits to remove the gases produced during the pyrolysis process and to either liquefy them for further processing or use as process fuel or to directly use the gases so produced to fuel the gasification process of the present invention.

In order that the present invention may be more fully understood, an example will now be described by way of illustration only with reference to the accompanying drawings, of which:

Figure 4:
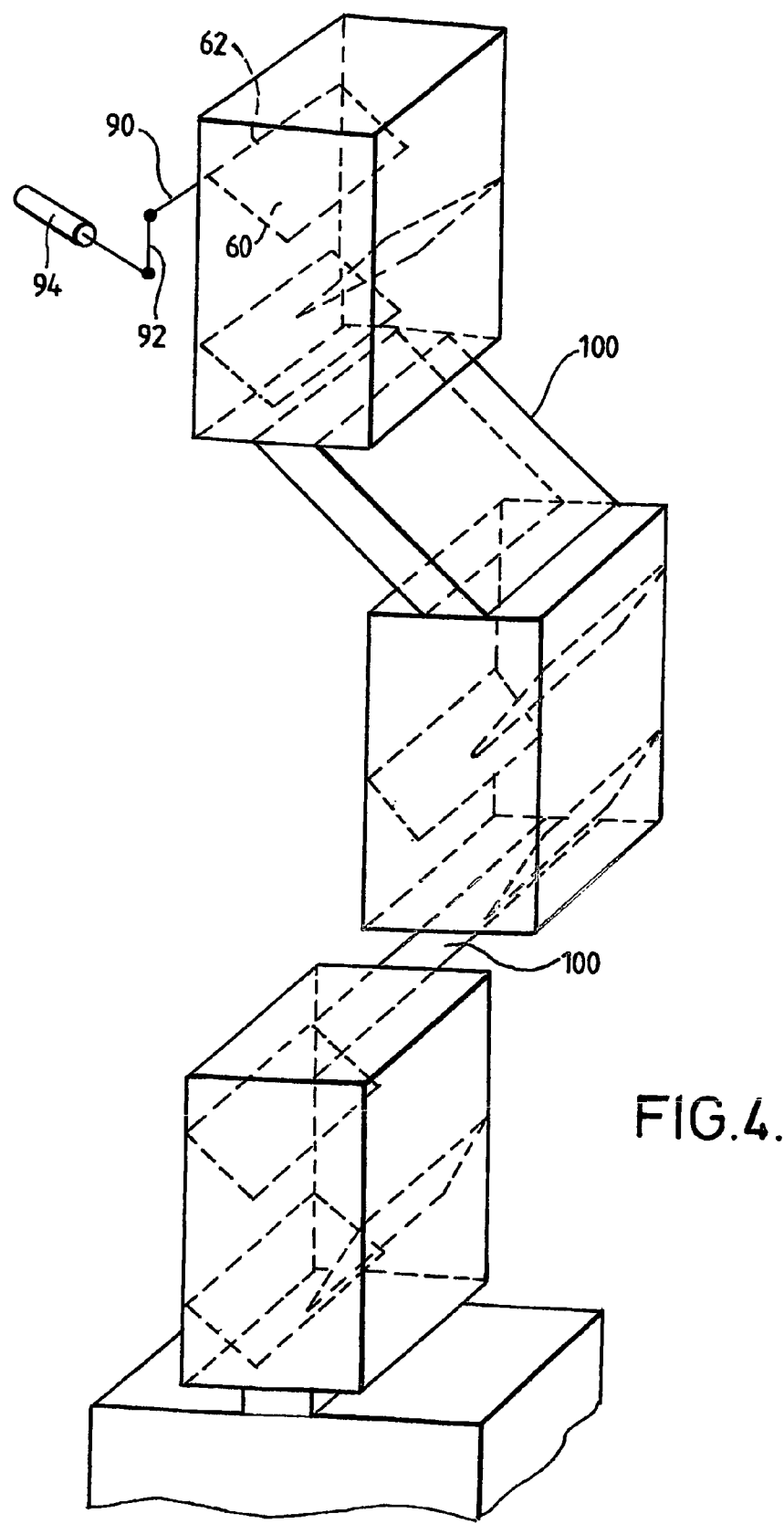

FIG. 4 which shows an alternative arrangement of a series of pyrolysis units employed in a second embodiment of an apparatus according to the present invention.

The same or similar features in the drawings will be denoted by common reference numerals.

Figure 1:
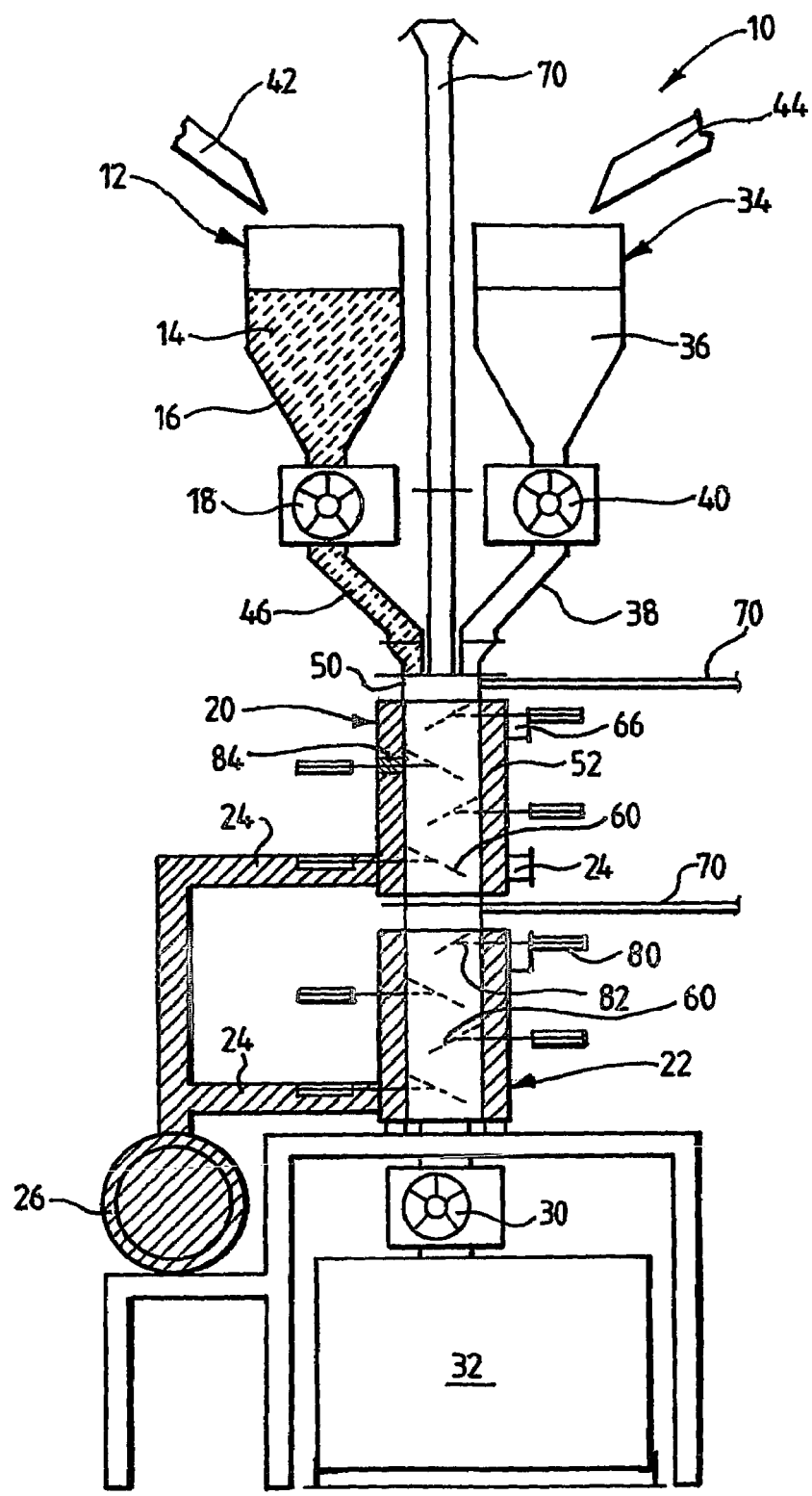
FIG. 1 shows a view in elevation of a first schematic embodiment of an apparatus according to the present invention.

FIG. 1 shows a schematic representation in elevation of an apparatus 10 for treating waste material such as soil, for example, contaminated with oil, for example. However, the apparatus shown in FIG. 1 could equally well be used for treating a waste stream comprising pre-treated municipal black bag waste, for example, as described hereinabove.

The apparatus comprises a hopper 12 for holding the contaminated waste 14. The hopper has a lower frusto-conical portion 16 leading to a rotary valve 18, the velocity of rotation of which and hence the rate at which the waste 14 is removed from the hopper 12 is controlled by a control system (not shown) at a variable rate depending upon the desired flow rate. The flowing waste falls into a first pyrolysis unit 20 and then into a second pyrolysis unit 22. The pyrolysis units 20, 22 are heated by burning gas supplied by pipes 24 from a burner 26. The flowing waste material finally passes from the second pyrolysis unit 22 into a further rotary valve 30 from which it is discharged into an ash box 32. The apparatus is also provided with a second, additional hopper 34 which contains a treatment assist material 36, in this instance, sand. The hopper itself may be provided with heating means (not shown) and/or the sand may be heated by heaters (not shown) surrounding a transfer conduit 38 which takes the treatment assist material from a rotary valve 40 which controls the flow rate thereof. The transfer conduit 38 delivers the treatment assist material under the influence of gravity to the first pyrolysis unit 20 from which point the treatment assist material flows through the apparatus with the waste material being treated until finally passing into the ash box 32.

The hopper 12 is maintained at a relatively constant level with waste 14 by means of a conveyor and chute 42, for example. The purpose of keeping the hopper at a constant level is to maintain a generally constant seal to prevent excessive amounts of air/oxygen from entering the system. Similarly, the additional hopper, when in use, is also maintained at a constant level with sand, for example, by a suitable supply system such as a second conveyor and chute arrangement 44. The rotary valves 18, 30, 40 are also intended to prevent excess ingress of oxygen into the system and comprise a plurality of individual compartments around the periphery of the valve wheel which fill with waste or treatment assist material and are then sealed against a peripheral outer member as they rotate towards a lower opening where the contained material drops into the transfer conduit 46, 38. Similarly, the valve 30 acts in the same manner and controls in an airtight manner the discharge of treated material from the apparatus.

Figure 2:
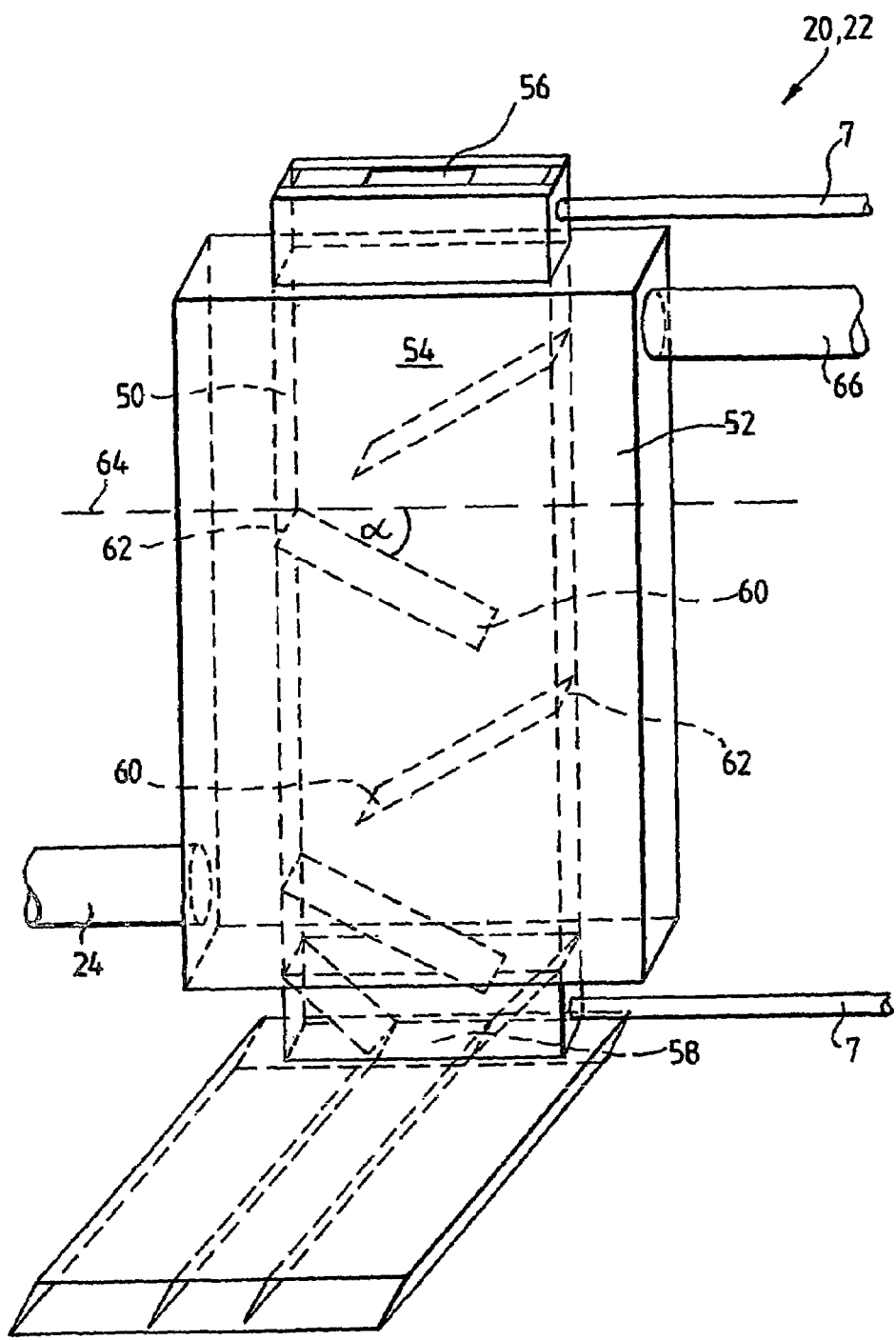
FIG. 2 shows a perspective schematic view of a pyrolysis unit in more detail.

The construction of the pyrolysis units 20, 22 will now be explained in greater detail with reference to FIG. 2. Each pyrolysis unit 20, 22 has an inner chamber or passage 50 and surrounding outer chamber 52. The inner chamber provides an air tight passage 54 for the waste material 14 and treatment assist material 36, if present, from the transfer conduits 46, 38 to the final discharge rotary valve 30. The inner chamber has an entry aperture 56 and an exit aperture 58, the entry aperture 56 being connected in an airtight manner either to the transfer conduits 46, 38 or to the exit aperture 58 of a preceding pyrolysis unit. Similarly, the exit aperture 58 of the pyrolysis unit is connected in an airtight manner either to the entry aperture 56 of a downstream pyrolysis unit or to the valve 30 at the discharge end of the cycle. The inner chamber 50 is provided with a series of vanes 60, the attitude of which may be controlled or varied as desired. The vanes extend substantially across the whole width of the inner chamber and are pivotable about their outer edge 62 so that the angle $\alpha$ between the plane of the vane and a horizontal datum line (shown as dashed line 64) may be varied and controlled by means externally of the pyrolysis unit. The series of vanes 60 form a cascade from entry to exit of the pyrolysis unit forcing waste material and treatment assist material to fall in a cascade from one vane to the next. The outer chamber 52 essentially forms a closed volume around the vertical faces of the inner chamber 50 and receives combustion gases from the burner 26 via the pipes 24 so as to heat the inner chamber 50. An exhaust pipe 66 takes the spent and cooled combustion gases away to a flare stack 70. The rate of flow of the waste material and treatment assist material through the pyrolysis unit may be controlled by the angles of the vanes 60 being varied. If, for example, the temperature of the inner chamber and waste material is too low then the rate of flow of material may be reduced by reducing the angle $\alpha$. Conversely, if the material is overheating, the rate of flow may be increased by increasing the angle $\alpha$. As shown in the flow chart of FIG. 3, The angles of the vanes are adjusted automatically in response to temperature sensors in the pyrolysis units. Each pyrolysis unit is provided with gas collection conduits 72 connected in an airtight manner to the inner chamber 50. The gas collection conduits lead the gases produced during pyrolysis of the waste material away to suitable further use or processing apparatus. The gases could be used as a heating fuel to make the apparatus self-sustaining or lead away to liquefaction apparatus to store the products for further processing into useful products.

There are many ways of controlling the attitude of the vanes 60 as will be recognised by those skilled in the chemical or process engineering art. In FIG. 1, for example, the vanes 60 are shown with hydraulically or pneumatically actuated jacks 80 in operable association therewith, a jack rod 82 being connected to the underside of each vane so that inward or outward movement of the jack rod 82 raises or lowers the free end of the vane, respectively. The jack rod may pass through and slide in an airtight bushing 84 in the walls of the inner and outer chambers.

Alternatively, as indicated schematically in FIG. 4, the pivoted edges 62 of the vanes may have shafts 90 or axles attached thereto which pass through the inner and outer chamber walls and have lever arms 92 secured thereto and which are connected to suitable actuating devices 94 such as electromechanical, hydraulic or pneumatic actuators, for example. These are shown on one vane in the upper pyrolysis unit only, however, in practice all vanes and pyrolysis units may be so equipped.

In all cases the actuating means for controlling the attitude of the vanes 60 preferably respond automatically in response to control signals from temperature sensors associated with the pyrolysis units.

Figure 3:
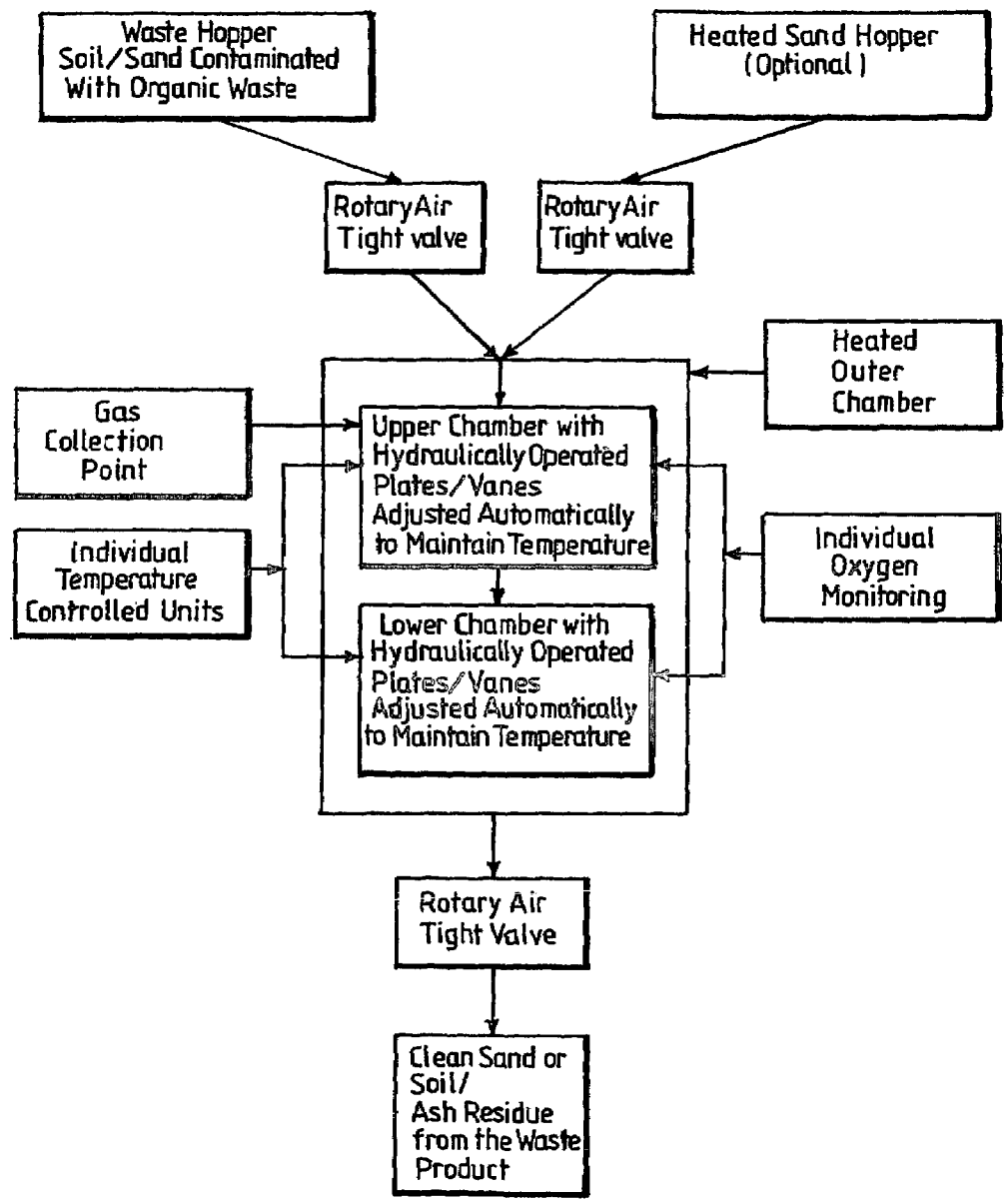
FIG. 3 shows a flow chart relating to the apparatus shown in FIG. 1.

FIG. 3 essentially shows a flow diagram corresponding to the apparatus shown and described with reference to FIGS. 1 and 2.

FIG. 4 shows a stack of three pyrolysis units linked to each other by sloping manifold portions 100. The manifold portions are set at a mean angle of the vanes 60 so that the rate of material through flow between pyrolysis units does not vary greatly from the flow rate within each pyrolysis unit.

Although a simple collection box 32 is shown at the end of the process to receive the residue of treated material, this may be replaced with more complex equipment intended to separate the treated waste from the treatment assist material, for example. Such equipment may include conveyors and screening sieves or fluidised bed separation equipment, for example.

The invention claimed is:

1. A method of treating organic waster material comprising the steps of:
   providing at least one pyrolysis unit having a chamber in which a plurality of vanes in the form of pivotally adjustable plates are mounted one above the other at alternate sides;
   supplying the material to a hopper;
   feeding the material at a controllable rate from the hopper into an upper end of the chamber so that as it passes downwards it falls from each vane onto the next lower vane in the manner of a cascade;
   heating the chamber;
   sensing the temperature in the chamber;
   automatically adjusting the attitude of the vanes in response to the temperature which has been sensed so as to control the rate of flow of material through the chamber;
   removing gaseous products from the chamber; and
   collecting waste material from the bottom of the chamber.

2. A method according to claim 1 including the further step of supplying a treatment assist material to said at least one pyrolysis unit and passing said treatment assist material through said at least one pyrolysis unit simultaneously with said waste material.

3. A method according to claim 2 including the further step of heating said treatment assist material before its entry into said at least one pyrolysis unit.

4. A method according to claim 2 wherein said treatment assist material is sand.

5. A method according to claim 1 wherein said waste material is heated within the chamber of said at least one pyrolysis unit substantially in the absence of oxygen.

6. An apparatus for treating organic waste material, comprising:
   hopper means having flow control means for controlling the rate of flow of material from said hopper means;
   at least one pyrolysis unit comprising a chamber in which a plurality of vanes are mounted, the vanes being positioned one above the other at alternate sides of the chamber so that in passage through the unit, from top to bottom thereof, the material falls from each vane onto the next lower vane in the manner of a cascade, the vanes also being adjustable in attitude so as to control the rate of flow of material through the chamber, and heating means for heating said chamber;
   means for removing gaseous products generated in the pyrolysis unit; and
   treated waste material collection means, characterized in that the vanes are in the form of pivotably adjustable plates, in that temperature sensors are provided within the pyrolysis unit and in that the attitude of the respective vanes is automatically adjustable, via a control system, in response to signals from these temperature sensors.

7. An apparatus according to claim 6, further comprising at least one vibrator or shaker to assist flow of material through the pyrolysis unit.

8. An apparatus according to claim 6 wherein the attitude of each vane is individually adjustable.

9. An apparatus according to claim 6 further comprising a means for holding a treatment assist material to be passed through said at least one pyrolysis unit.

10. An apparatus according to claim 6 wherein the chamber of the pyrolysis unit in which the vanes are mounted is sealed from ingress of oxygen.

11. An apparatus according to claim 6 wherein the heating means includes an outer chamber surrounding at least vertical walls of the chamber in which the vanes are mounted and means for supplying heating gases to said outer chamber.

12. An apparatus according to claim 6 having a plurality of pyrolysis units.

* * * * *